US006765955B1

(12) United States Patent
Davis et al.

(10) Patent No.: US 6,765,955 B1
(45) Date of Patent: Jul. 20, 2004

(54) METHODS, SYSTEMS AND COMPUTER PROGRAM PRODUCTS ESTABLISHING A COMMUNICATION CONFIGURATION FOR A MODEM CONNECTION TO COMPENSATE FOR ECHO NOISE

(75) Inventors: Gordon Taylor Davis, Chapel Hill, NC (US); Dongming Hwang, Cary, NC (US); Malcolm Scott Ware, Raleigh, NC (US); Hua Ye, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/430,699

(22) Filed: Oct. 29, 1999

(51) Int. Cl.[7] .................................................. H04B 1/38

(52) U.S. Cl. ...................... 375/222; 375/219; 375/224; 370/493; 370/252

(58) Field of Search ................................. 375/222, 219, 375/224; 370/493, 252, 468

(56) References Cited

U.S. PATENT DOCUMENTS

| | | | |
|---|---|---|---|
| 3,557,308 A | 1/1971 | Alexander et al. | 178/69.5 |
| 3,622,877 A | 11/1971 | MacDavid et al. | 324/73 R |
| 3,683,120 A | 8/1972 | Schenkel | 179/15 A |
| 3,729,717 A | 4/1973 | de Koe et al. | 340/172.5 |
| 4,112,427 A | 9/1978 | Hofer et al. | 340/347 |
| 4,132,242 A | 1/1979 | Carroll, Jr. | 137/263 |
| 4,208,630 A | 6/1980 | Martinez | 375/7 |
| 4,237,552 A | 12/1980 | Aikoh et al. | 370/83 |
| 4,270,027 A | 5/1981 | Agrawal et al. | 179/81 R |
| 4,434,322 A | 2/1984 | Ferrell | 178/22.13 |
| 4,450,556 A | 5/1984 | Boleda et al. | 370/58 |

(List continued on next page.)

FOREIGN PATENT DOCUMENTS

| | | | |
|---|---|---|---|
| EP | 0 473 116 A2 | 8/1991 | H04N/1/00 |
| EP | 0 659 007 A2 | 11/1994 | H04M/11/06 |
| EP | 0 669 740 A2 | 12/1994 | H04L/27/00 |
| FR | 2 345 019 | 3/1976 | H04L/27/10 |
| WO | WO 96/18261 | 6/1996 | H04M/11/00 |
| WO | WO 98/37657 | 8/1998 | |

OTHER PUBLICATIONS

Erup, et al., *Interpolation in Digital Modems—Part II: Implementation and Performance*, IEEE Transactions on Communications, vol. 41, No. 6, pp. 998–1008 (Jun. 1993).

(List continued on next page.)

*Primary Examiner*—Stephen Chin
*Assistant Examiner*—Curtis Odom
(74) *Attorney, Agent, or Firm*—Myers, Bigel, Sibley & Sajovec, P.A.; Scott W. Reid

(57) ABSTRACT

Methods, systems and computer program products for configuring a modem communication session when conditions associated with echo noise on a digitally discontinuous channel are detected are provided. The condition is detected at the local modem by reference to the local modem's respective transmit and receive rates. A low transmit rate is an indication of a channel problem. Furthermore, where the transmit rate is also lower than the receive rate, the problem is likely at the remote modem end not just a uniformly noisy channel. This combination of conditions has been found to result, for example, from middle echo noise. Once the remote modem side condition is detected various steps may be taken by the local modem to improve the channel performance including boosting its transmit power (which may raise signal power at the remote modem receiver without affecting the level of echo noise), enabling only a low symbol rate for its transmissions (which may concentrate the signal power in a narrower spectrum band to improve signal power) and/or disabling the use of strong pre-emphasis by the remote modem (which may reduce echo noise by reducing remote modem transmit power over a portion of the spectrum). In particular, these approaches have been found to improve performance of V.90 modems operating in fall back (V.34) mode.

30 Claims, 5 Drawing Sheets

U.S. PATENT DOCUMENTS

| | | | |
|---|---|---|---|
| 4,577,310 A | 3/1986 | Korsky et al. .................. 370/58 |
| 4,578,796 A | 3/1986 | Charalambous et al. ........ 375/8 |
| 4,720,861 A | 1/1988 | Bertrand ....................... 381/36 |
| 4,731,816 A | 3/1988 | Hughes-Hartogs ........... 379/98 |
| 4,756,007 A | 7/1988 | Qureshi et al. ............... 375/37 |
| 4,760,598 A | 7/1988 | Ferrell .......................... 380/44 |
| 4,797,898 A | 1/1989 | Martinez ....................... 375/7 |
| 4,833,706 A | 5/1989 | Hughes-Hartogs ........... 379/98 |
| 4,868,863 A | 9/1989 | Hartley et al. ................ 379/98 |
| 4,884,285 A | 11/1989 | Heynen et al. ................ 375/25 |
| 4,890,303 A | 12/1989 | Bader ........................... 375/107 |
| 4,890,316 A | 12/1989 | Walsh et al. ................... 379/98 |
| 4,894,847 A | 1/1990 | Tjahjadi et al. .............. 375/121 |
| 4,901,333 A | 2/1990 | Hodgkiss ....................... 375/98 |
| 4,943,980 A | 7/1990 | Dobson et al. ................ 375/42 |
| 4,953,210 A | 8/1990 | McGlynn et al. ............. 380/48 |
| 4,967,413 A | 10/1990 | Otani ........................... 371/37.4 |
| 4,972,360 A | 11/1990 | Cukier et al. ........... 364/724.04 |
| 4,985,902 A | 1/1991 | Gurcan ......................... 375/14 |
| 4,991,169 A | 2/1991 | Davis et al. ................... 370/77 |
| 4,995,030 A | 2/1991 | Helf ............................. 370/32.1 |
| 5,005,144 A | 4/1991 | Nakajima et al. ............ 364/565 |
| 5,007,047 A | 4/1991 | Sridhar et al. ............... 370/32.1 |
| 5,014,299 A | 5/1991 | Klupt et al. ................... 379/98 |
| 5,033,062 A | 7/1991 | Morrow et al. ................ 375/7 |
| 5,038,365 A | 8/1991 | Belloc et al. .................. 375/8 |
| 5,040,190 A | 8/1991 | Smith et al. .................... 375/4 |
| 5,052,000 A | 9/1991 | Wang et al. ................... 371/43 |
| 5,058,134 A | 10/1991 | Chevillat et al. .............. 375/39 |
| 5,065,410 A | 11/1991 | Yoshida et al. ................ 375/98 |
| 5,067,125 A | 11/1991 | Tsuchida ...................... 370/79 |
| 5,068,875 A | 11/1991 | Quintin ........................ 375/78 |
| 5,107,520 A | 4/1992 | Karam et al. ................. 375/60 |
| 5,111,481 A | 5/1992 | Chen et al. .................... 375/14 |
| 5,119,401 A | 6/1992 | Tsujimoto ..................... 375/14 |
| 5,119,403 A | 6/1992 | Krishnan ...................... 375/39 |
| 5,134,611 A | 7/1992 | Steinka et al. ................. 370/79 |
| 5,142,552 A | 8/1992 | Tzeng et al. ................... 375/14 |
| 5,157,690 A | 10/1992 | Buttle .......................... 375/14 |
| 5,187,732 A | 2/1993 | Suzuki .......................... 379/5 |
| 5,210,755 A | 5/1993 | Nagler et al. ................. 370/108 |
| 5,225,997 A | 7/1993 | Lederer et al. .............. 364/550 |
| 5,253,272 A | 10/1993 | Jaeger et al. .................. 375/60 |
| 5,253,291 A | 10/1993 | Naseer et al. ................ 379/406 |
| 5,265,151 A | 11/1993 | Goldstein ..................... 379/97 |
| 5,285,474 A | 2/1994 | Chow et al. ................... 375/13 |
| 5,291,479 A | 3/1994 | Vaziri et al. ................. 370/58.2 |
| 5,309,476 A * | 5/1994 | Murray et al. ............... 375/222 |
| 5,311,578 A | 5/1994 | Bremer et al. ................ 379/97 |
| 5,317,594 A | 5/1994 | Goldstein ...................... 375/8 |
| 5,351,134 A | 9/1994 | Yaguchi et al. ............. 358/435 |
| 5,353,280 A | 10/1994 | Ungerböck ................. 370/32.1 |
| 5,386,438 A | 1/1995 | England ....................... 375/121 |
| 5,394,110 A | 2/1995 | Mizoguchi ................... 329/304 |
| 5,394,437 A | 2/1995 | Ayanoglu et al. ........... 375/222 |
| 5,398,303 A | 3/1995 | Tanaka ......................... 395/51 |
| 5,402,445 A | 3/1995 | Matsuura ...................... 375/229 |
| 5,406,583 A | 4/1995 | Dagdeviren ................... 375/5 |
| 5,418,842 A | 5/1995 | Cooper ........................ 379/98 |
| 5,432,794 A | 7/1995 | Yaguchi ....................... 371/5.5 |
| 5,434,884 A | 7/1995 | Rushing et al. ............. 375/235 |
| 5,450,438 A * | 9/1995 | Landry et al. ............... 375/222 |
| 5,475,711 A | 12/1995 | Betts et al. ................... 375/240 |
| 5,491,720 A | 2/1996 | Davis et al. ................. 375/222 |
| 5,513,216 A | 4/1996 | Gadot et al. ................. 375/233 |
| 5,519,703 A | 5/1996 | Chauffour et al. ............ 370/84 |
| 5,528,625 A | 6/1996 | Ayanoglu et al. ........... 375/222 |
| 5,528,679 A | 6/1996 | Taarud ........................ 379/34 |
| 5,533,048 A | 7/1996 | Dolan .......................... 375/222 |
| 5,534,913 A | 7/1996 | Majeti et al. ................. 348/7 |
| 5,546,395 A | 8/1996 | Sharma et al. ................ 370/84 |
| 5,563,908 A | 10/1996 | Kaku et al. .................. 375/222 |
| 5,566,211 A | 10/1996 | Choi ........................... 375/332 |
| 5,598,401 A | 1/1997 | Blackwell et al. ............ 379/94 |
| 5,625,643 A | 4/1997 | Kaku et al. .................. 375/222 |
| 5,634,022 A | 5/1997 | Crouse et al. .............. 395/704 |
| 5,640,387 A | 6/1997 | Takahashi et al. .......... 370/359 |
| 5,646,958 A | 7/1997 | Tsujimoto ................... 375/233 |
| 5,671,250 A | 9/1997 | Bremer et al. .............. 375/222 |
| 5,694,420 A | 12/1997 | Ohki et al. ................... 375/222 |
| 5,710,792 A | 1/1998 | Fukawa et al. .............. 375/229 |
| 5,724,393 A | 3/1998 | Dagdeviren ................. 375/296 |
| 5,726,765 A | 3/1998 | Yoshida et al. .............. 358/412 |
| 5,729,226 A | 3/1998 | Betts et al. ................... 341/94 |
| 5,732,104 A | 3/1998 | Brown et al. ................ 375/222 |
| 5,734,663 A | 3/1998 | Eggenberger .............. 371/39.1 |
| 5,751,717 A | 5/1998 | Babu et al. .................. 370/466 |
| 5,751,796 A | 5/1998 | Scott et al. ............. 379/93.31 |
| 5,754,594 A | 5/1998 | Betts et al. ................... 375/285 |
| 5,757,849 A | 5/1998 | Gelblum et al. ............ 375/222 |
| 5,757,865 A | 5/1998 | Kaku et al. .................. 375/344 |
| 5,761,247 A | 6/1998 | Betts et al. ................... 375/316 |
| 5,768,311 A | 6/1998 | Betts et al. ................... 375/222 |
| 5,778,024 A | 7/1998 | McDonough ............... 375/216 |
| 5,784,377 A | 7/1998 | Baydar et al. .............. 370/463 |
| 5,784,405 A | 7/1998 | Betts et al. ................... 375/222 |
| 5,784,415 A | 7/1998 | Chevillat et al. ........... 375/341 |
| 5,793,809 A | 8/1998 | Holmquist ................... 375/242 |
| 5,796,808 A | 8/1998 | Scott et al. ............. 379/93.31 |
| 5,801,695 A | 9/1998 | Townshend ................. 375/340 |
| 5,805,669 A | 9/1998 | Bingel et al. ................. 379/28 |
| 5,809,075 A | 9/1998 | Townshend ................. 375/254 |
| 5,812,537 A | 9/1998 | Betts et al. ................... 370/286 |
| 5,815,534 A | 9/1998 | Glass ........................... 375/326 |
| 5,822,371 A | 10/1998 | Goldstein et al. ........... 375/242 |
| 5,825,816 A | 10/1998 | Cole et al. .................. 375/222 |
| 5,825,823 A | 10/1998 | Goldstein et al. ........... 375/286 |
| 5,831,561 A | 11/1998 | Cai et al. ..................... 341/106 |
| 5,835,532 A | 11/1998 | Strolle et al. ................ 375/233 |
| 5,835,538 A | 11/1998 | Townshend ................. 375/295 |
| 5,838,724 A | 11/1998 | Cole et al. .................. 375/222 |
| 5,839,053 A | 11/1998 | Bosch et al. ................ 455/13.1 |
| 5,844,940 A | 12/1998 | Goodson et al. ............ 375/222 |
| 5,850,388 A | 12/1998 | Anderson et al. ........... 370/252 |
| 5,850,421 A | 12/1998 | Misra et al. ................. 375/354 |
| 5,852,630 A * | 12/1998 | Langberg et al. ........... 375/219 |
| 5,852,631 A | 12/1998 | Scott .......................... 375/222 |
| 5,862,141 A * | 1/1999 | Trotter ........................ 370/468 |
| 5,862,179 A | 1/1999 | Goldstein et al. ........... 375/242 |
| 5,862,184 A | 1/1999 | Goldstein et al. ........... 375/295 |
| 5,870,429 A | 2/1999 | Moran, III et al. ......... 375/222 |
| 5,872,817 A | 2/1999 | Wei ............................ 375/341 |
| 5,881,066 A | 3/1999 | Lepitre ....................... 371/20.5 |
| 5,881,102 A | 3/1999 | Samson ....................... 375/222 |
| 5,887,027 A | 3/1999 | Cohen et al. ............... 375/222 |
| 5,911,115 A | 6/1999 | Nair et al. ................... 455/63 |
| 5,914,982 A | 6/1999 | Bjarnason et al. .......... 375/222 |
| 5,918,204 A | 6/1999 | Tsurumaru .................. 704/214 |
| 5,926,506 A | 7/1999 | Berthold et al. ............ 375/222 |
| 6,101,216 A * | 8/2000 | Henderson et al. ......... 375/222 |
| 6,266,348 B1 * | 7/2001 | Gross et al. ................ 370/252 |
| 6,381,267 B1 * | 4/2002 | Abdelilah et al. .......... 375/222 |

OTHER PUBLICATIONS

Fischer, *Signal Mapping for PCM Modems, V–pcm Rapporteur Meeting,* Sunriver, Oregon, USA, , 5 pgs. (Sep. 4–12, 1997).

Gardner, *Interpolation in Digital Modems—Part I: Fundamentals,* IEEE Transactions on Communications, vol. 41, No. 3, pp. 501–507 (Mar. 1993).

Humblet et al., *The Information Driveway*, IEEE Communications Magazine, pp. 64–68 (Dec. 1996).

Kalet et al., *The Capacity of PCM Voiceband Channels*, IEEE International Conference on Communications '93, pp. 507–511 (Geneva, Switzerland, May 23–26, 1993).

Mueller et al., *Timing Recovery in Digital Synchronous Data Receiver*, IEEE Transactions on Communications, vol. Com–24, No. 5, pp. 516–531 (May 1976).

Okubo et al., *Building Block Design of Large Capacity PCM–TDMA Subscriber System and Direct Digital Interface to Digital Exchange*, Japan Radio Co., Ltd., pp. 69–73 (Japan).

Pahlavan et al., *Nonlinear Quantization and the Design of Coded and Uncoded Signal Constellations*, IEEE Transactions on Communications, vol. 39, No. 8, pp. 1207–1215 (Aug. 1991).

Proakis, *Digital Signaling Over a Channel with Intersymbol Interference*, Digital Communications, pp. 373, 381 (McGraw–Hill Book Company, 1983).

Williams et al., *Counteracting the Quantisation Noise from PCM Codecs*, BT Laboratories, pp. 24–29 (UK).

*A Digital Modem and Analogue Modem Pair for Use on the Public Switched Telephone Network (PSTN) at Data Signalling Rates of Up to 56 000 Bit/s Downstream and 33 600 Bit/s Upstream*, ITU–T V.90 (Sep. 1998).

*Series V: Data Communication Over the Telephone Network; Interfaces and voiceband modems; A modem operating at data signalling rates of up to 33 600 bit/s for use on the general switched telephone network and on leased point–to–point 2–wire telephone type circuits*, ITU–T V.34 (Oct. 1996).

Bell, R.A., et al., *Automatic Speed Reduction and Switched Network Back–up*, IBM Technical Disclosure Bulletin, vol. 32, No. 1, pp. 154–157 (Jun. 1989).

Abbiate, J.C., et al., *Variable–Data Transmission Modem*, IBM Tecnical Disclosure Bulletin, vol. 17, No. 11, pp. 3301–3302 (Apr. 1975).

*Data Communication Over the Telephone Network; Procedures for Starting Sessions of Data Transmission Over the General Switched Telephone Network*, ITU–T V.8 (Sep. 1994).

*Line Quality Monitoring Method*, IBM Technical Disclosure Bulletin, vol. 18, No. 8, pp. 2726–2726 (Jan. 1976).

*Loopback Tests for V.54 Data Communication Equipment*, IBM Technical Disclosure Bulletin, vol. 32, No. 3A, pp. 295–299 (Aug. 1989).

*On–Line Real Time Modem Testing*, IBM Technical Disclosure Bulletin, vol. 20, No. 6, pp. 2252–2254 (Nov. 1977).

Pierobon, Gianfranco L., *Codes of Zero Spectral Density at Zero Frequency*, IEEE Transactions on Information Theory, vol. IT–30, No. 2, pp. 435–439 (Mar. 1984).

Marcus, Brian H, et al., *On Codes with Spectral Nulls at Rational Submultiples of the Symbol Frequence*, IEEE Transactions on Information Theory, vol. IT–33, No. 4, pp. 557–568 (Jul. 1987).

Fischer, Robert, et al., *Signal Mapping for PCM Modems*, ITU–Telecommunications Standardization Sector PCM '97–120, V.pcm Rapporteur Meeting, (Sunriver, Oregon; Sep. 4–12, 1997).

*Pulse Code Modulation (PCM) of Voice Frequencies*, ITU–T, Recommendation G.711 (Geneva, 1972).

*Series G: Digital Transmission Systems: Terminal Equipments—Coding of analogue signals by pulse code modulation; Pulse code modulation (PCM) of voice frequencies*, ITU–T, Recommendation G.711 (Geneva, 1996).

*Data Communication Over the Telephone Network; Error–Correcting Procedures for DCEs Using Asynchronous–to–Synchronous Conversion*, ITU–T V.42 (Mar. 1993).

*Improvement to Spectral Shaping Techniques*, Research Disclosure, V. 41, n415,415111, pp. 1550–1551 (Nov. 1998).

*TIA Standard Draft: North American Telephone Network Transmission Model for Evaluating Analog Client to Digitally Connected Server Modems*, Telecommunications Industry Association, PN3857, Draft 10 (Feb. 1999).

Davis, Gordon T., *DSP and MATLAB implementation of model–based constellation generation* (Sep. 18, 1998).

Woodruff, K.R, et al, *Automatic and Adaptive System and Efficient Communication in Noisy Communication Line Environments*, IBM Technical Disclosure Bulletin, vol. 24, No. 9, pp. 4627–4629 (Feb. 1982).

Godard, D., et al., *Decision Feedback Equalizer Stabilization in Adaptive Mode*, IBM Technical Disclosrue Bulletin, vol. 24, No. 11A, pp. 5691–5692 (Apr. 1982).

Borgnis–Desbordes, P., et al. *Variable–Speed Data Transmission*, IBM Technical Disclosure Bulletin, vol. 27, No. 4A, pp. 2269–2270 (Sep. 1984).

Couland, G., et al., *Analog Wrap Self–Tests in Modems During Retrain Operations*, IBM Technical Disclosure Bulletin, vol. 28, No. 6, p. 2457 (Nov. 1985).

Maddens, F., *Sixteen–State Forward Convolutional Encoder*, IBM Technical Disclosure Bulletin, vol. 28, No. 6, pp. 2466–2468 (Nov. 1985).

*Remote Modem–Type Self–Learning*, IBM Technical Disclosure Bulletin, vol. 28, No. 6, pp. 2398–2399 (Nov. 1985).

Maddens, F., *Sixteen–State Feedback Convolutional Encoder*, IBM Technical Disclosure Bulletin, vol. 28, No. 10, pp. 4212–4213 (Mar. 1986).

Bell, R. A., et al., *Automatic Speed Reduction and Switched Network Back–up*, IBM Technical Disclosure Bulletin, vol. 32, No. 1, pp. 154–157 (Jun. 1989).

Nobakht, R.A., *Trellis–Coded Modulation Coding Scheme for a 19/2 Kbps Modem*, IBM technical Disclosure Bulletin, vol. 36, No. 11, pp. 167–170 (Nov. 1993).

Nobakht, R.A. *Unified Table Based Subset Decoder for the Viterbi Algorithm*, IBM Technical Disclosure Bulletin, vol. 37, No. 09, pp. 581–587 (Sep. 1994).

Nobakht, R.A., *Trellis Subset Decoder Algorithm Based on a Pattern Recognition Scheme*, IBM Technical Disclosure Bulletin, vol. 37, No. 10, pp. 693–697 (Oct. 1994).

Abbiate, J.C., et al, *Variable–Data Transmission Modem*, IBM Technical Disclosure Bulletin, vol. 17, No. 11, pp. 3301–3302 (Apr. 1975).

Barlet, J., et al., *Full Speed Recovery in High Speed Modems*, IBM Technical Disclosure Bulletin, vol. 17, 23, No. 2, pp. 641–643 (Jul. 1980).

Dialog Abstract, *Sample rate converter for duplex modem*, European Patent No. 285413.

Dialog Abstract, *Two–speed full–duplex modem for telephone network*, PCT WO 8501407.

Dialog Abstract, *Digital data transmission system*, European Patent No. 124674.

Dialog Abstract, *Facsimile communication controller*, Japanese Publication No. 04–175060 (Jun. 23, 1992).

Dialog Abstract, *Picture communication equipment,* Japanese Publication No. 03–120954 (May 23, 1991).

Dialog Abstract, *Radio date transmission,* Japanese Publication No. 01–179535 (Jul. 17, 1989).

Dialog Abstract, *Facsimile device,* Japanese Publication No. 57–164654 (Oct. 9, 1982).

Dialog Abstract, *Data repeater,* Japanese Publication No. 57–087255 (Mar 31, 1982).

Dialog Abstract, *Blinding training method for decision feedback equaliser having feed–forward and feedback filters,* European Patent No. 880253.

Dialog Abstract, *Processing method for distorted signal received by qam receiver,* European Patent No. 465851.

Dialog Abstract, *Establishing wireless communication channel,* PCT No. WO 9905820.

Dialog Abstract, *High–speed rate adaptive subscriber line digital data modem,* PCT No. WO 9830001.

Dialog Abstract, *Digital modem in digital modulation system,* Japanese Patent No. 8116341.

Dialog Abstract, *Communication equipment and radio communication adapter,* Japanese Publication No. 08–340289 (Dec. 24, 1996).

Dialog Abstract, *Data recording method,* Japanese Publication No. 05–089597 (Apr. 9, 1993).

Dialog Abstract, *Transmission control system for data communication and its modem equipment,* Japanese Publication No. 02–228853 (Sep. 11, 1990).

Nabuib, A.F., et al., Dialog Abstract, *A space–time coding modem for high–data–rate wireless communication,* IEEE Journal of Selected Areas in Communications, vol. 16, No. 8, pp. 1459–1478 (Oct. 1998).

Denno, S., et al., Dialog Abstract, *Mbit/s burst modem with an adaptive equalizer for TDMA mobile radio communication,* IEICE Transactions on Communications, vol. E81–B, No. 7, pp. 1453–1461 (Jul. 1998).

Naguib, A.F., et al., Dialog Abstract, *A space–time coding modem for high–data–rate wireless communications,* GLOBECOM 97, IEEE Global Telecommunications Conference, vol. 1, pp. 102–109 (1997).

Kobayashi, K., et al., Dialog Abstract, *Fully digital burst modem for satellite multimedia communications sytems,* IEICE Transactions on Communications, vol. E80–B, No. 1, pp. 8–15 (Jan. 1997).

Skellern, D.J., et al., Dialog Abstract, *A high speed wireless LAN,* IEEE Micro, vol. 17, No. 1, pp. 40–47 (Jan.–Feb. 1997).

Enomoto, K., et al., Dialog Abstract, *A mode switching type burst demodulator AFC,* Transactions of the Institute of Electronics, Information and Communication Engineers, vol. J76B–II, No. 5, pp. 415–421 (May 1993).

Betts, W., Dialog Abstract, *Nonlinear encoding by surface projection,* International Conference on Data Transmission—Advances in Modem and ISDN Technology and Applications (Sep. 23–25, 1992).

Schilling, D.L., et al., Dialog Abstract, *The FAVR meteor burst communication experiment,* Military Communications in a Changing World MILCOM '91 (Nov. 4–7, 1991).

Jacobsmeyer, J.M., Dialog Abstract, *Adaptive trellis–coded modulation for bandlimited meteor burst channels,* IEEE Journal of Selected Areas in Communications, vol. 10, No. 3, pp. 550–561 (Apr. 1992).

Sato, T., et al., Dialog Abstract, *Protocol configuration and verification of an adaptive error control scheme over analog cellular networks,* IEEE Transactions on Vehicular Technology, vol. 41, No. 1, pp. 69–76 (Feb. 1992).

Lee, L.–N., et al., Dialog Abstract, *Digital signal processor–based programmable BPSK/QPSK/offset–QPSK modems,* COMSAT Technical Review, pp. 195–234 (Fall 1989).

Sato, T., et al., Dialog Abstract, *Error–free high–speed data modem,* Oki Technical Review, vol. 56, No. 133, pp. 20–26 (Apr. 1989).

Seo, J.–S, et al., Dialog Abstract, *Performance of convolutional coded SQAM in hardlimited satellite channels,* IEEE International Conference on Communications BOSTON-ICC/89, vol. 2, pp. 787–791 (Jun. 11–14, 1989).

Murakama, K., et al., Dialog Abstract, *FEC combined burst–modem for business satellite communications use,* IEEE/IECE Global Telecommunications Conference 1987, vol. 1, pp. 274–280 (Japan, Nov. 15–18, 1987).

McVerry, F., Dialog Abstract, *Performance of a fast carrier recovery scheme for burst–format DQPSK transmission over satellite channels,* International Conference on Digital Processing of Signals in Communications, pp. 165–172 (United Kingdom, 1985).

Filter, J.H.J., Dialog Abstract, *An algorithm for detecting loss of synchronisation in data transmission test sets (modems),* Transactions of the South African Institute of Electrical Engineers, vol. 76, No. 1, pp. 39–43 (Jan. 1985).

Gersho, A., Dialog Abstract, *Reduced complexity implementation of passband adaptive equlizers,* IEEE Journal on Selected Areas in Communications, vol. SAC–2, No. 5, pp. 778–779 (Sep. 1984).

Dialog Abstract, *High–speed full–duplex modem reduces telephone connect time,* EDN, vol. 27, No. 18, p. 77 (Sep. 15, 1982).

Chadwick, H., Dialog Abstract, *Performance of a TDMA burst modem through a dual nonlinear satellite channel,* Fifth International Conference on Digital Satellite Communications, pp. 63–67 (Italy, Mar. 23–26, 1981).

Nussbaumer, H., Dialog Abstract, *Reducing the acquisition time in an automatic equalizer,* IBM Technical Disclosure Bulletin, vol. 18, No. 5, pp. 1465–1479 (Oct. 1975).

Uzunoglu, V., et al., Dialog Abstract, *Synchronous and the coherent phase–locked synchronous oscillators: new techniques in synchronization and tracking,* IEEE Transactions on Circuits and Systems, vol. 36, No. 7, pp. 997–1004 (Jul. 1989).

Minei, I., et al., Dialog Abstract, *High–speed Internet access through unidirectional geostationary satellite channels,* IEEE Journal on Selected Areas in Communications, vol. 17, No. 2, pp. 345–359 (Feb., 1999).

Ovadai, S., Dialog Abstract, *The effect of interleaver depth and QAM channel frequencey offset on the performance of multichannel AM–VSB/256–QAM video lightwave transmission systems,* International Conference on Telecommunications: Bridging East and West Through Communications, vol. 1, pp. 339–343 (Greece, Jun. 21–25, 1998).

Johnson, R.W., et al., Dialog Abstract, *Error correction coding for serial–tone HG transmission,* Seventh International Conference on HF Radio Systems, and Techniques, pp. 80–84 (United Kingdom, Jul. 7–10, 1997).

Karasawa, Y., et al., Dialog Abstract, *Cycle slip in clock recovery on frequency–selective fading channels,* IEEE Transactions on Communications, vol. 45, No. 3, pp. 376–383 (Mach. 1997).

Umehira, M., et al., Dialog Abstract, *design and performance of burst carrier recovery using a phase compensated filter,* Transactions of the Institute of Electronics, Information and Communication Engineers, vol. J78B–II, No. 12, pp. 735–746 (Dec. 1995).

De Bot, P., et al., Dialog Abstract, *An example of a multi-resolution digital terrestrial TV modem,* Proceeings of ICC '93—IEEE International Conference on Communications, vol. 3, pp. 1785–1790 (Switzerland, May 23–26, 1993).

Lei, Chen, et al., Dialog Abstract, *Single–tone HF High speed data modem,* Proceedings of Tencon '93—IEEE Region 10 International Conference on Computers, Communications and Automation, vol. 3, pp. 94–98 (China, Oct. 19–21, 1993).

Woerner, B.D., et al., Dialog Abstract, *Simulation issues for future wireless modems,* IEEE Communications, vol. 32, No. 7, pp. 42–53 (Jul. 1994).

Sato, T., et al., Dialog Abstract, *Vehicle terminal equipment with dedicated DSP,* Oki Technical Review, vol. 58, No. 144, pp. 49–52 (Jul. 1992).

Sato, T., et al., Dialog Abstract, *Protocol configuration and verification of an adaptive error control scheme over analog cellular networks,* IEEE Transactions on Vehicular Technology, vol. 41, No. 1, pp. 69–76 (Feb. 1992).

Tamm, Yu.A., Dialog Abstract, *The effect of suppressing harmonic interference using an adaptive equalizer,* Elektrosvyaz, vol. 45, No. 3, pp. 5–10 (Mach. 1990).

Saleh, A.A.M., et al., Dialog Abstract, *An experimental TDMA indoor radio communications systemusing slow frequency hopping and coding,* IEEE Transactions on Communications, vol. 39, No. 1, pp. 152–162 (Jan. 1991).

Nergis, A., Dialog Abstract, *Optimum HF digital communications sytems with block coding and interleaving techniques,* Proceedings of the 1990 Bilkent International Conference on New Trends in Communication, Control and Signal Processing, vol. 1, pp. 511–517 (Turkey, Jul. 2–5, 1990).

Kawamata, F., et al., Dialog Abstract, *An evaluation of voice codecs and facsimiles,* Review of the Communications Research Laboratory, vol. 36, pp. 69–73 (Mar. 1990).

Sato, T., et al., Dialog Abstract, *Error–free high–speed data transmission protocol simultaneously applicable to both wire and mobile radio channels,* 38$^{th}$ IEEE Vehicular Technology Conference: 'Telecommunications Freedom—Technology on the Move', pp. 489–496 (Jun. 15–17, 1988).

Dialog Abstract, *1200–bit/s cellular modem DLD03H,* Oki Technical Review, vol. 53, No. 127, pp. 70–72 (Jul. 1987).

Chamberlin, J.W., et al., Dialog Abstract, *Design and field test of a 256–QAM DIV modem,* IEEE Journal on Selected Areas in Communications, vol. SAC–5, No. 3, pp. 349–356 (Apr. 1987).

De Cristofaro, R., et al., Dialog Abstract, *A 120 Bv/s QPSK modem designed for the INTELSAT TDMA network,* International Journal of Satellite Communications, vol. 3, Nos. 1–2, pp. 145–160 (Jan.Jun., 1985).

Shumate, A., Dialog Abstract, *Error correction coding for channels subject to occasional losses of bit count integrity,* IEEE Military Communications Conference, vol. 1, pp. 89–93 (Oct. 21–24, 1984).

Suyderhoud, H., et al., Dialog Abstract, *Investigation of 9.6 kb/s data transmission via a PCM link at 64 kb/s with and without link errors,* International Journal of Satellite Communications, vol. 2, No. 1, pp. 81–87 (Jan.–Mar. 1984).

Smith, C., Dialog Abstract, *Relating the performance of speech processors to the bit error rate,* Speech Technology, vol. 2, No. 1, pp. 41–53 (Sep.–Oct. 1983).

Suyderhoud, H., et al., Dialog Abstract, *Investigation of 9.6–kbit/s data transmission via a PCM link at 64 kbit/s with and without link errors,* Sixth International Conference on Digital Satellite Communications Proceedings, pp. 26–33 (Sep. 19, 23, 1983).

Kittel, L., Dialog Abstract, *Analogue and discrete channel models for signal transmission in mobile radio,* Frequenz., vol. 36, Nos. 4–5, pp. 153–160 (Apr.–May 1982).

Farrell, P.G., et al., Dialog Abstract, *Soft–decision error control of h.f. data transmission,* IEE Proceedings F (Communications, Radar and Signal Processing), vol. 127, No. 5, pp. 389–400 (Oct. 1980).

Johnson, A.L., Dialog Abstract, *Simulation and implementation of a modulation system for overcoming ionospheric scintillation fading,* AGARD Conference Proceedings No. 173 on Radio Systems, and the Ionosphere, pp. 3/1–5 (Greece, May 26–30, 1975).

Matsumura, K., et al., Dialog Abstract, *Anti–interference data–transmission set of HF radio equipment,* Mitsublishi Electric Engineer, No. 41, pp. 18–23 (Sep., 1974).

Blank, H.A., et al., Dialog Abstract, *A Markov error channel model,* 1973 National Telecommunications Conference, vol. 1, pp. 15B/1–8 (Nov. 26–28, 1973).

McGruther, W.G., Dialog Abstract, *Long term error performance data for operation at 2400 bps ona nonswitched private line network,* Summaries of papers presented at 1970 Canadian symposium on communications, pp. 65–66 (Canada, Nov. 12–13, 1970).

Burton, H.O., et al., Dialog Abstract, *On the use of error statistics from data transmission on telephone facilities to estimate performance of forward–error–correction,* 1970 international conference on communications, p. 21 (Jun. 8–10, 1970).

Bowen, R.R., Dialog Abstract, *Application on burst error correction codes to data modems for dispersive channels,* Proceedings of the 1970 international symposium on information theory, p. 1 (Netherlands, Jun. 15–19, 1970).

Pierce, A.W., et al., Dialog Abstract, *Effective application of forward–acting error–control coding to multichannel h.f. data modems,* IEEE Transactions on Communication Technology, vol. Com–18, No. 4, pp. 281–294 (Aug. 1970).

West, R.L., Abstract, *Data Concentration Method,* IBM Technical Dislcosure Bulletin, pp. 487–489; http://w3.infogate.ibm.com:1207/SESS506884/GETDOC/39/2/1 (Jul., 1975).

Haas, L.C., et al., Abstract, *Received Line Signal Quality Analysis,* IBM Technical Disclosure Bulletin, pp. 5414–5416; http://w3.infogate.ibm.com:1207/SESS506884/GETDOC/43/1/1 (May, 1981).

Nussbaumer, H., Abstract, *Reducing the Acquisition Time in an Automatic Equalizer,* IBM Technical Disclosure Bulletin, pp. 1465–1479; http://w3.infogate.ibm.com:1207/SESS506884/GETDOC/40/2/1 (Oct. 1975).

Dialog Abstract, *Listener echo canceller for digital communication system,* PCT No. WO 9310607.

Dialog Abstract *Reduced time remote access method for modem computer,* PCT No. WO 9209165.

\* cited by examiner

METHODS, SYSTEMS AND COMPUTER PROGRAM PRODUCTS ESTABLISHING A COMMUNICATION CONFIGURATION FOR A MODEM CONNECTION TO COMPENSATE FOR ECHO NOISE

FIELD OF THE INVENTION

The present invention relates generally to the field of modems, and, more particularly, to modem startup protocols.

BACKGROUND OF THE INVENTION

The demand for remote access to information sources and data retrieval, as evidenced by the success of services such as the World Wide Web, is a driving force for high-speed network access technologies. Today's telephone network offers standard voice services over a 4 kHz bandwidth. Traditional analog modem standards generally assume that both ends of a modem communication session have an analog connection to the public switched telephone network (PSTN). Because data signals are typically converted from digital to analog when transmitted towards the PSTN and then from analog to digital when received from the PSTN, data rates may be limited to 33.6 kbps as defined in the V.34 transmission recommendation developed by the International Telecommunications Union (ITU).

The need for an analog modem can be eliminated, however, by using the basic rate interface (BRI) of the Integrated Services Digital Network (ISDN). A BRI offers end-to-end digital connectivity at an aggregate data rate of 160 kbps, which is comprised of two 64 kbps B channels, a 16 kbps D channel, and a separate maintenance channel. ISDN offers comfortable data rates for Internet access, telecommuting, remote education services, and some forms of video conferencing. ISDN deployment, however, has been very slow due to the substantial investment required of network providers for new equipment. Because ISDN is not very pervasive in the PSTN, the network providers have typically tarriffed ISDN services at relatively high rates, which may be ultimately passed on to the ISDN subscribers. In addition to the high service costs, subscribers must generally purchase or lease network termination equipment to access the ISDN.

While most subscribers do not enjoy end-to-end digital connectivity through the PSTN, the PSTN is nevertheless mostly digital. Typically, the only analog portion of the PSTN is the phone line or local loop that connects a subscriber or client modem (e.g., an individual subscriber in a home, office, or hotel) to the telephone company's central office (CO). In recent years, local telephone companies have been replacing portions of their original analog networks with digital switching equipment. Nevertheless, the connection between the home and the CO has been the slowest to change to digital as discussed in the foregoing with respect to ISDN BRI service. A recent data transmission recommendation issued by the ITU, known as V.90, takes advantage of the digital conversions that have been made in the PSTN. By viewing the PSTN as a digital network, V.90 technology is able to accelerate data downstream from the Internet or other information source to a subscriber's computer at data rates of up to 56 kbps, even when the subscriber is connected to the PSTN via an analog local loop.

To understand how the V.90 recommendation achieves this higher data rate, it may be helpful to briefly review the operation of V.34 analog modems. V.34 modems are optimized for the situation where both ends of a communication session are connected to the PSTN by analog lines. Even though most of the PSTN is digital, V.34 modems treat the network as if it were entirely analog. Moreover, the V.34 recommendation assumes that both ends of the communication session suffer impairment due to quantization noise introduced by analog-to-digital converters. That is, the analog signals transmitted from the V.34 modems are sampled at 8000 times per second by a codec upon reaching the PSTN with each sample being represented or quantized by an eight-bit pulse code modulation (PCM) codeword. The codec uses 256, non-uniformly spaced, PCM quantization levels defined according to either the $\mu$-law or A-law companding standard (ie., the ITU G.711 Recommendation).

Because the analog waveforms are continuous and the binary PCM codewords are discrete, the digits that are sent across the PSTN can only approximate the original analog waveform. The difference between the original analog waveform and the reconstructed quantized waveform is called quantization noise, which limits the modem data rate.

While quantization noise may limit a V.34 communication session to 33.6 kbps, it nevertheless affects only analog-to-digital conversions. The V.90 standard relies on the lack of analog-to-digital conversions outside of the conversion made at the subscriber's modem to enable transmission at 56 kbps.

The general environment for which the V.90 standard was developed is depicted in FIG. 1. An Internet Service Provider (ISP) 22 is connected to a subscriber's computer 24 via a V.90 digital server modem 26, through the PSTN 28 via digital trunks (e.g., T1, E1, or ISDN Primary Rate Interface (PRI) connections), through a central office switch 32, and finally through an analog loop to the client's modem 34. The central office switch 32 is drawn outside of the PSTN 28 to better illustrate the connection of the subscriber's computer 24 and modem 34 into the PSTN 28. It should be understood that the central office 32 is, in fact, a part of the PSTN 28. The operation of a communication session between the subscriber 24 and an ISP 22 is best described with reference to the more detailed block diagram of FIG. 2.

Transmission from the server modem 36 to the client modem 34 will be described first. The information to be transmitted is first encoded using only the 256 PCM codewords used by the digital switching and transmission equipment in the PSTN 28. These PCM codewords are transmitted towards the PSTN 28 by the PCM transmitter 36 where they are received by a network code. The PCM data is then transmitted though the PSTN 28 until reaching the central office 32 to which the client modem 34 is connected. Before transmitting the PCM data to the client modem 34, the data is converted from its current form as either $\mu$-law or A-law companded PCM codewords to pulse amplitude modulated (PAM) voltages by the codec expander (digital-to-analog (D/A) converter) 38.

These PAM voltage levels are processed by a central office hybrid 42 where the unidirectional signal received from the codec expander 38 is transmitted towards the client modem 34 as part of a bidirectional signal. A second hybrid 44 at the subscriber's analog telephone connection converts the bidirectional signal back into a pair of unidirectional signals. Finally, the analog signal from the hybrid 44 is converted into digital PAM samples by an analog-to-digital (A/D) converter 46, which are received and decoded by the PAM receiver 48. Note that for transmission to succeed effectively at 56 kbps, there must be only a single digital-to-analog conversion and subsequent analog-to-digital conversion between the server modem 26 and the client modem 34. Recall that analog-to-digital conversions in the PSTN 28 can introduce quantization noise, which may limit the data rate as discussed previously. The A/D converter 46 at the client modem 34, however, may have a higher resolution than the A/D converters used in the analog portion of the PSTN 28 (e.g., 16 bits versus 8 bits), which results in less quantization noise. Moreover, the PAM receiver 48 needs to be in synchronization with the 8 kHz network clock to properly decode the digital PAM samples.

Transmission from the client modem 34 to the server modem 26 follows the V.34 data transmission standard. That is, the client modem 34 includes a V.34 transmitter 52 and a D/A converter 54 that encode and modulate the digital data to be sent using techniques such as quadrature amplitude modulation (QAM). The hybrid 44 converts the unidirectional signal from the digital-to-analog converter 54 into a bidirectional signal that is transmitted to the central office 32. Once the signal is received at the central office 32, the central office hybrid 42 converts the bidirectional signal into a unidirectional signal that is provided to the central office codec. This unidirectional, analog signal is converted into either μ-law or A-law companded PCM codewords by the codec compressor (A/D converter) 56, which are then transmitted through the PSTN 28 until reaching the server modem 26. The server modem 26 includes a conventional V.34 receiver 58 for demodulating and decoding the data sent by the V.34 transmitter 52 in the client modem 34. Thus, data is transferred from the client modem 34 to the server modem 26 at data rates of up to 33.6 kbps as provided for in the V.34 standard.

The V.90 standard only offers increased data rates (e.g., data rates up to 56 kbps) in the downstream direction from a server to a subscriber or client. Upstream communication still takes place at conventional data rates as provided for in the V.34 standard. Nevertheless, this asymmetry is particularly well suited for Internet access. For example, when accessing the Internet, high bandwidth is most useful when downloading large text, video, and audio files to a subscriber's computer. Using V.90, these data transfers can be made at up to 56 kbps. On the other hand, traffic flow from the subscriber to an ISP consists of mainly keystroke and mouse commands, which are readily handled by the conventional rates provided by the V.34 standard.

The V.90 standard, therefore, provides a framework for transmitting data at rates up to 56 kbps provided the network is capable of supporting the higher rates. The most notable requirement is that there can be at most one digital-to-analog conversion and no analog-to-digital conversion in the downstream path within the network. Nevertheless, other digital impairments, such as robbed bit signaling (RBS) and digital mapping through PADs which results in attenuated signals, can also inhibit transmission at V.90 rates. Communication channels exhibiting non-linear frequency response characteristics are yet another impediment to transmission at the V.90 rates. Moreover, these other factors may limit conventional V.90 performance to less than the 56 kbps theoretical data rate.

Articles such as Humblet et al., "The Information Driveway," IEEE Communications Magazine, December 1996, pp. 64–68, Kalet et al., "The Capacity of PCM Voiceband Channels," IEEE International Conference on Communications '93, May 23–26, 1993, Geneva, Switzerland, pp. 507–511, Fischer et al., "Signal Mapping for PCM Modems," V-pcm Rapporteur Meeting, Sunriver, Oregon, USA, Sep. 4–12, 1997, and Proakis, "Digital Signaling Over a Channel with Intersymbol Interference," Digital Communications, McGraw-Hill Book Company, 1983, pp. 373, 381, provide general background information on digital communication systems.

One problem encountered by modems communicating over channels having topologies which include digital to analog (D/A) conversions is that an echo may be generated by the associated two to four wire conversion interface. Server modems typically are provided with echo canceling circuitry to compensate for the expected echo which results from the D/A conversion required for the final leg of the connection over the analog local loop even in network topologies that are otherwise all digital. This echo is sometimes referred to as near end echo generated by the circuitry of the server modem's own network. However, some network topologies include one or more extra DI/A conversions in the channel which results in a condition referred to as a digital discontinuity. In addition to causing a V.90 modem to fall back to V.34 mode, a digital discontinuity located on the local loop to a client modem may also generate an additional echo which may be referred to as a middle echo as it typically has a delay longer than the near end echo. An example of a network topology which may generate such a middle echo is one which includes a Universal Digital Loop Carrier (UDLC) system in the local loop between the client modem and the server modem. Such middle echos may not be effectively canceled by the echo canceling circuit of prior art modems which are typically designed to control near end echo. Accordingly, a need exists for improved systems and methods for modem communications.

SUMMARY OF THE INVENTION

It is an object of the present invention to provide methods, systems, and computer program products which may be able to improve performance of a modem communication session over a channel subject to echo noise.

These and other objects, advantages, and features of the present invention are provided by methods, systems, and computer program products for configuring a modem communication session when conditions associated with echo noise on a digitally discontinuous channel are detected. The condition is detected at the local modem by reference to the local modem's respective transmit and receive rates. A low transmit rate is an indication of a channel problem. Furthermore, where the transmit rate is also lower than the receive rate, the problem is likely at the remote modem end not just a uniformly noisy channel. This combination of conditions has been found to result, for example, from middle echo noise. Once the remote modem side condition is detected various steps may be taken by the local modem to improve the channel performance including boosting its transmit power (which may raise signal power at the remote modem receiver without affecting the level of echo noise), enabling only a low symbol rate for its transmissions (which may concentrate the signal power in a narrower spectrum band to improve signal power) and/or disabling the use of strong pre-emphasis by the remote modem (which may reduce echo noise by reducing remote modem transmit power over a portion of the spectrum). In particular, these approaches have been found to improve performance of V.90 modems operating in fall back (V.34 ) mode.

In one embodiment of the present invention, a method is provided for configuring a V.34 capable modem for a communication session with a remote modem. A receive data rate from the remote modem and a transmit data rate to the remote modem are detected during startup of the communication session. A retrain is then initiated when the transmit data rate is less than the receive data rate if the transmit data rate is less than a predetermined criterion. Transmit power to the remote modem of a transmitter of the modem is boosted during the retrain. In one embodiment, the communication session is on a digitally discontinuous channel subject to echo noise and the transmit power is boosted to provide a higher signal to echo noise ratio at the remote modem.

In another embodiment of the present invention, the retrain is initiated after setting a digital discontinuity flag which is set when the transmit data rate is less than the receive data rate if the transmit data rate is less than the predetermined criterion. The transmit power is boosted during the retrain when the digital discontinuity flag is set.

In a further embodiment of the present invention, a predetermined symbol rate is selected for the transmitter when the transmit data rate is less than the receive data rate if the transmit data rate is less than the predetermined criterion. In a further aspect, strong pre-emphasis for a transmitter of the remote modem is disabled when the transmit data rate is less than the receive data rate if the transmit data rate is less than the predetermined criterion. The modem and the remote modem in one embodiment are either a V.34 standard modem or a V.90 standard modem, the predetermined symbol rate may be 2400 symbols per second and pre-emphasis may be disabled for pre-emphasis indexes of 6 and above. In a further embodiment, initiating retrain operations include setting a digital discontinuity flag when the transmit data rate is less than the receive data rate if the transmit data rate is less than the predetermined criterion. A predetermined symbol rate is selected for the transmitter when the digital discontinuity flag is set. Strong pre-emphasis for a transmitter of the remote modem is disabled when the discontinuity flag is set. The selecting and disabling operations may be performed during phase 2 of startup of the communication session and the detecting and initiating operations may be performed during phase 4 of startup of the communication session. The 2400 symbol rate may be specified by specifying 2400 symbols per second as the symbol rate in the $INFO_{1a}$ signal.

As will further be appreciated by those of skill in the art, while described above primarily with reference to method aspects, the present invention may be embodied as methods, apparatus/systems, and/or computer program products.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF THE PREFERRED EMBODIMENTS

Figure 1:
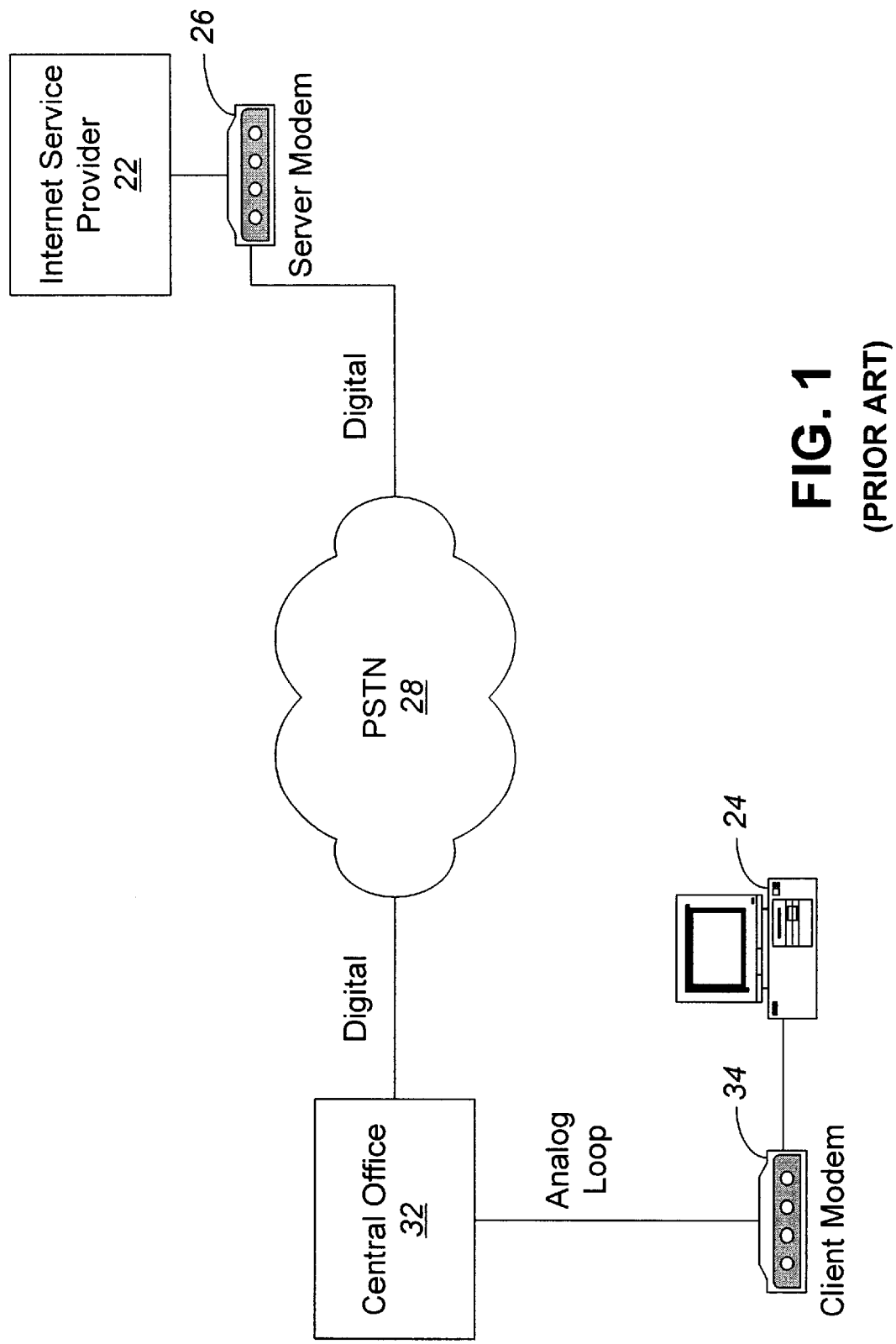
FIG. 1 is a block diagram illustrating a typical V.90 connection between a subscriber and an ISP in accordance with the prior art.

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. Like reference numbers signify like elements throughout the description of the figures.

As will be appreciated by those skilled in the art, the present invention can be embodied as a method, a digital signal processing system, or a computer program product. Accordingly, the present invention can take the form of an entirely hardware embodiment, an entirely software (including firmware, resident software, micro-code, etc.) embodiment, or an embodiment containing both software and hardware aspects. Furthermore, the present invention can take the form of a computer program product on a computer-usable or computer-readable storage medium having computer-usable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention is typically written in a high level programming language such as C or C++. Nevertheless, some modules or routines may be written in assembly or machine language to optimize speed, memory usage, or layout of the software or firmware in memory. Assembly language is typically used to implement time-critical code segments. In a preferred embodiment, the present invention uses assembly language to implement most software programs. It should further be understood that the program code for carrying out operations of the present invention may also execute entirely on a client modem, partly on a client modem, partly on a client modem and partly on a server modem, or partly in a client modem, partly in a server modem, and partly in the PSTN.

Figure 3:
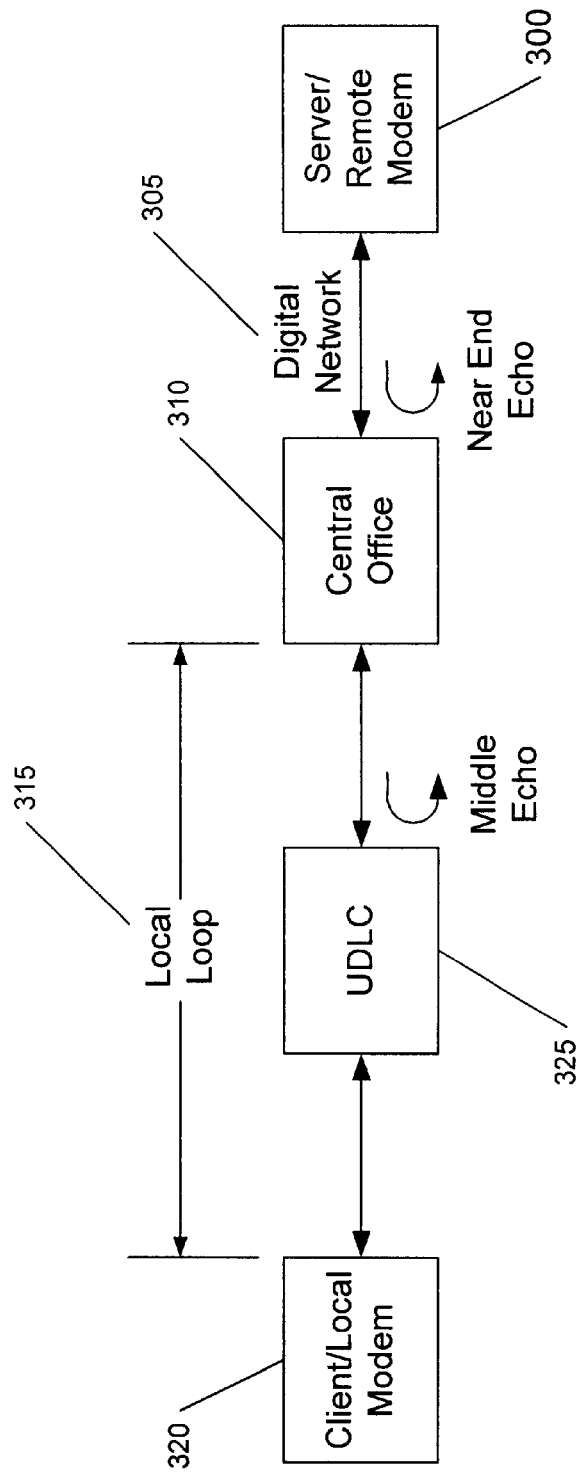
FIG. 3 is a block diagram of a modem according to an embodiment of the present invention in a channel subject to middle echo noise.

The present invention will now be further described with reference to the block diagram illustration of an embodiment of a system for configuring a modem for a communication session with a remote modem of FIG. 3. More particularly, FIG. 3 illustrates a client or a local modem 320 in accordance with an embodiment of the present invention which is coupled to a server or remote modem 300 over a network topology which provides a digitally discontinuous channel. Note that the present invention will be generally described herein with reference to the local modem implementing the present invention as a client or analog modem operating pursuant to at least one of the V.90 or V.34 standards. However, it is to be understood that the benefits of the present invention may be applied to a server modem and may further be applied to other modem communication protocols in connection with a communication session subject to performance degradation due to signal echo noise or other noise sources which cause the remote modem to suffer greater performance degradation than the local modem (i.e., from the perspective of the local modem, greater performance degradation for the transmit side than the receive side).

As shown in FIG. 3 the server modem 300 is coupled over a digital network 305 which terminates at the central office 310. The central office 310 in turn communicates with the client modem 320 over the analog local loop 315. In the illustration of FIG. 3, a UDLC system 325 is positioned on the local loop 315 between the central office 310 and the client modem 320. As further shown in FIG. 3, the receiver of the server modem 300 is typically subject to near end echo noise caused by the reflection from the signal transmitted by the server modem 300 at the 4 to 2 wire interface circuitry of the D/A converter in the central office 310. The server modem 300 will generally include an echo canceler configured to cancel the near end echo noise signal. In the network of FIG. 3, the server modem 300 is also subject to middle echo noise caused by the additional digital to analog conversion in the UDLC system 325. It is to be understood that, while in the illustrated embodiment of FIG. 3 the digital discontinuity in the network topology is created by the UDLC system 325, a variety of other sources may introduce an extra A/D-D/A conversion between the central office 310 and the client modem 320. Examples of such sources of digital discontinuity are described, for example, in the ITU TIA standard PN 3857 draft 10 entitled "North American Telephone Network Transmission Model for Evaluating Analog Client to Digitally Connected Server Modems."

The delay experienced by the server modem 300 before receipt of the middle echo noise signal is typically greater than for the near end echo signal. In some cases, the echo canceler in the server modem 300 does not provide a sufficient length to properly cover the middle echo on the local loop 315, for example, as introduced by the UDLC 325. As a result, the server modem 300 may be unable to support desirable upstream (client to server) connection speeds due to the existence of the middle echo. In some cases the modems may be unable to establish a connection depending upon the level of the middle echo noise.

As will be described herein, the methods, systems and computer program products of the present invention may provide for improved, more reliable, connections between the client modem 320 and the server modem 300 in the presence of digital discontinuity sources, such as the UDLC system 325 in the local loop 315, which create a middle echo. Improved connection reliability may, thereby, be provided on digitally discontinuous channels.

Figure 4:
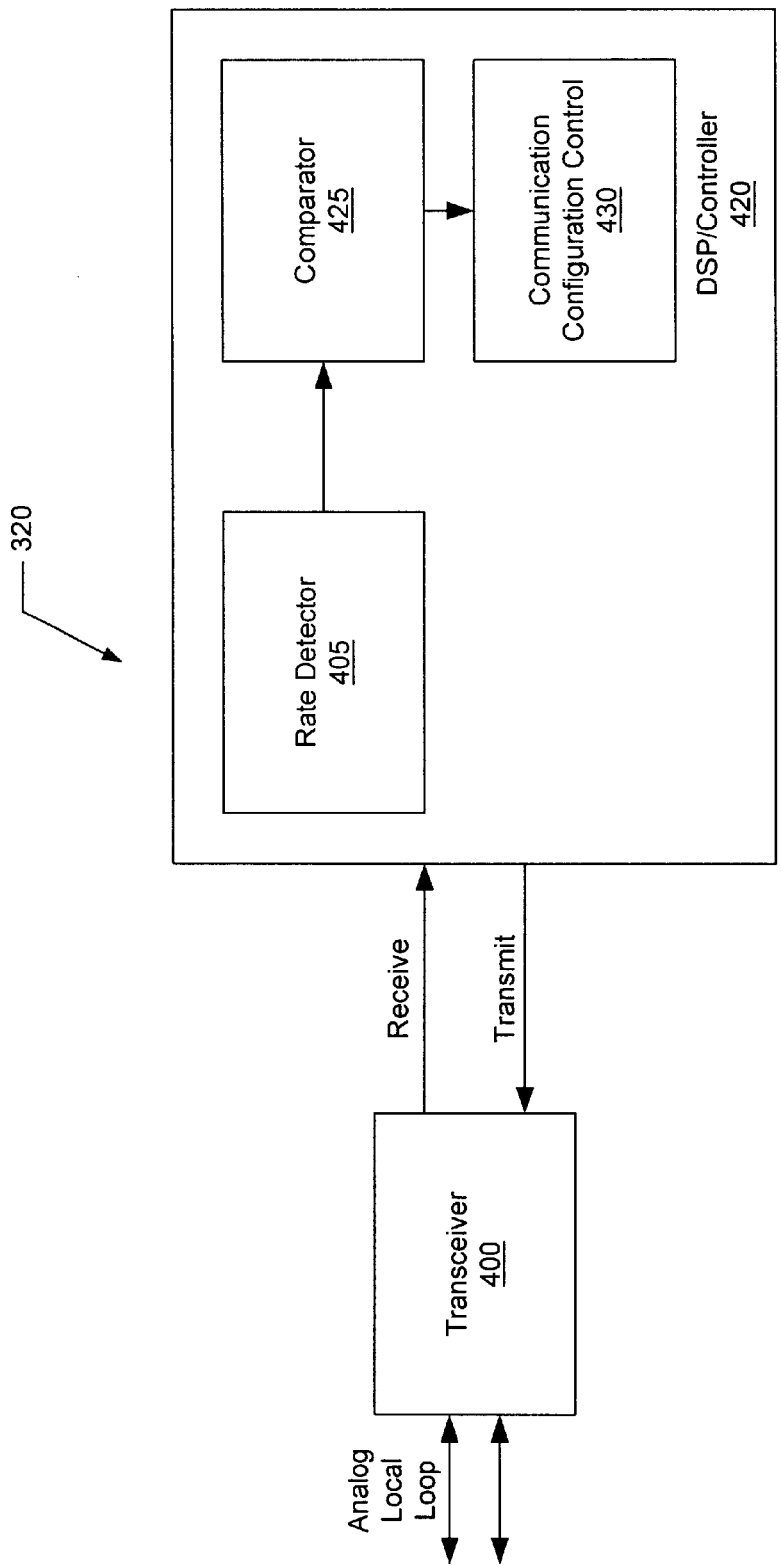
FIG. 4 is a block diagram of the modem illustrated in FIG. 3.

The client modem 320 of FIG. 3 is further illustrated in the block diagram of FIG. 4. As shown in FIG. 4, the client modem 320 is coupled to the local loop 315 through a transceiver 400 which supports both receive and transmit side communications over the two wire analog local loop 315. The transceiver 400 is coupled to a digital signal processor (DSP) or other controller device 420. The DSP 420 includes a rate detector 405 that detects both the receive data rate from the remote (server) modem 300 and a transmit data rate to the remote modem 300. The DSP 420 further includes a comparator 425 coupled to the rate detector 405 that determines when the transmit data rate is less than the receive data rate and further determines when the transmit data rate is less than a predetermined criterion associated with low data rates. The data rate comparison information from the comparator 425 is in turn provided to the communication configuration control circuit 430 which implements various steps to improve connection performance when transmit and receive data rates associated with a digital discontinuity, causing a middle echo noise problem at the remote modem end, is detected. The various steps which may be taken by the communication configuration control circuit 430 will be more fully described later herein in connection with the flow chart illustration of FIG. 5.

Figure 2:
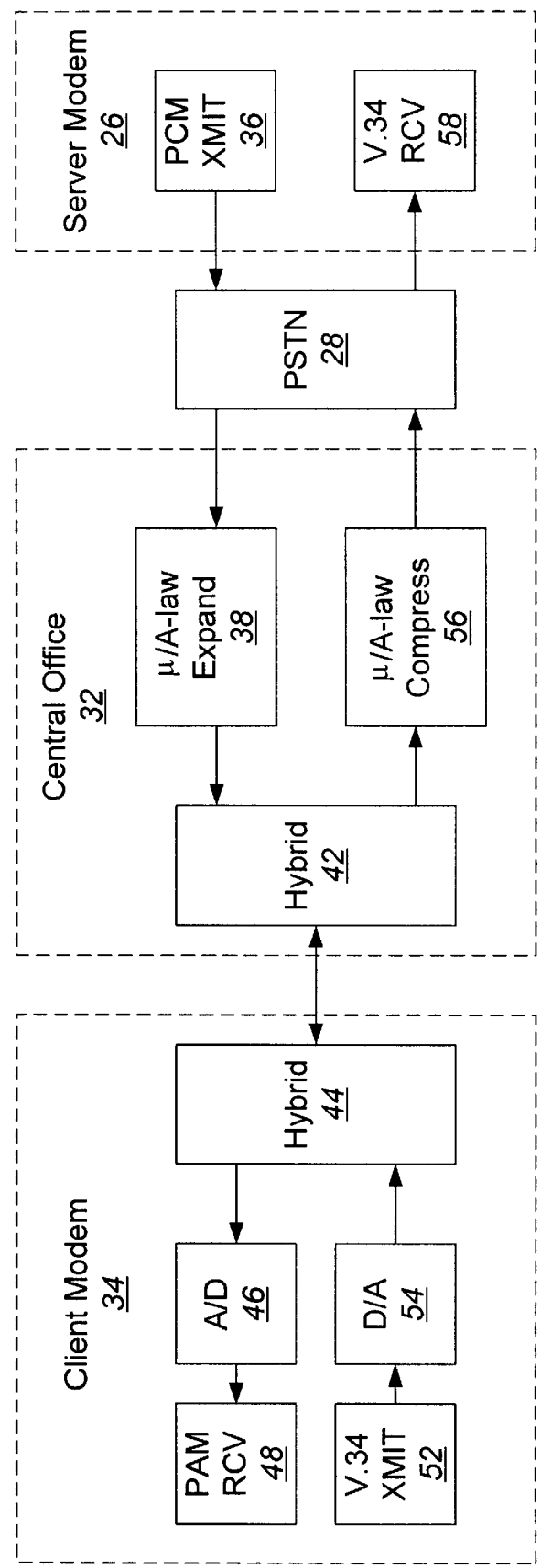
FIG. 2 is a detailed block diagram of the internal architecture and connections between the client modem, the central office, and the server modem of FIG. 1.

It is to be understood that, while the block diagrams of FIG. 3 and FIG. 4 illustrate various circuits of the present invention as discrete components, such circuits may be implemented in discrete hardware, as software executing on a programmable device such as a controller, as custom designed chips, or as a combination of the above. For example, the rate detector 405, the comparator 425 and the communication configuration control 430 are preferably implemented as code executing on the DSP 420. It is further to be understood that the client modem 320 typically includes additional circuitry associated with modem operations which are not illustrated in FIG. 4 as they are not necessary for an understanding of the present invention. For example, the client modem 320 typically will include the various components 44 through 54 illustrated in FIG. 2 as being part of the client modem 34.

Figure 5:
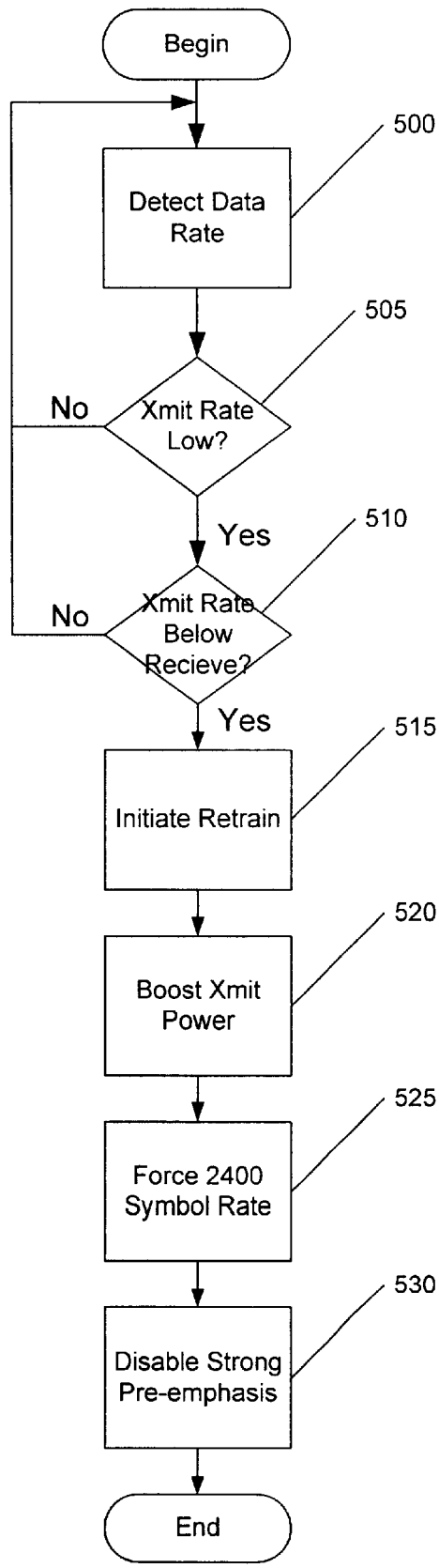
FIG. 5 is a flowchart illustrating operations for configuration of a communication session according to an embodiment of the present invention.

Referring now to FIG. 5, operations according to an embodiment of the present invention will now be further described. Operations begin at block 500 with detection by the client modem 320 of the transmit and receive data rates. More particularly, in the case of a V.90 modem, during the phase 4 startup procedure after the MP sequence is received from the digital server side modem 300, the analog client modem 320 will decide on the data rates that will be selected for both its transmitter and receiver. These data rates may be referred to herein as DATARATEX and DATARATER respectively. The code executing on the DSP 420 of the client modem 320 will then check first to determine if the connection is a V.90 connection or not by looking at a flag referred to herein as PCMRESP. If PCMRESP is not set, the client modem 320 understands that the connection is a V.34 connection. A V.34 connection may be established originally as selected or may be arrived at due to fall back procedures where a digital discontinuity has been detected in one of the earlier stages of the startup protocol under the V.90 standard. It is to be understood that, as the present invention is directed to improving performance of a communication session in the presence of a digital discontinuity in the local loop, operations in the subsequent blocks of FIG. 5 relate to conditions encountered by a V.34 modem or a V.90 modem operating in a fall back mode pursuant to the V.34 standard. It is to be further understood that, as noted above, while the present description focuses on the specific V.34 and V.90 standards, the present invention is not so limited and is directed to any communication context in which the protocol is operating subject to middle echo conditions.

In V.34 mode, after the data rates for receive and transmit are detected (500), the modem 320 determines if the transmit data rate is less than a predetermined criterion (block 505). In one embodiment, the predetermined criterion is to check if the data rate for transmit is lower than 12,000 symbols per second. If the transmit data rate is not below the predetermined criterion, then the channel is assumed not to have a server side modem 300 noise problem. If the transmit data rate is below the predetermined criterion then the transmit data rate is compared to the receive data rate for the client modem 320 (block 510). When the transmit data rate is equal or greater than the receive data rate, this typically indicates that the channel is generally noisy as contrasted with a channel having a receive side noise problem generally associated with echo problems encountered by the server modem 300. However, if the transmit rate is both at a low level (block 505) and below the receive rate (block 510) then a retrain is initiated (block 515).

More particularly, in one embodiment, a digital discontinuity flag is set at block 515 which indicates the existence of a remote (server) end noise problem. The digital discontinuity flag may also be used on the subsequent (following retrain) pass through phase 4 to avoid the need to detect data rates at block 500.

It is to be understood that, in the context of the V.90 standard, retrain procedures return startup operations to phase 2 of the startup procedure and begin execution of tone and tone reversal patterns (rather than retransmission of INFO$_0$) as described in Section 9.5 of the V.90 standard from the ITU.

In addition to initiating a retrain (block 515) the client modem 320 boosts the transmit power driving the client modem's upstream transmitter (block 520). Preferably, the transmit power is boosted by 3 dB. The retrain procedures then proceed utilizing the higher transmit power set at block 520. By boosting the transmit power the server modem's receive side performance may be improved as the power boost would be expected to increase the power level of the signal received by the remote modem 300 without increasing the noise level which is generated by an echo corresponding to the transmit power of the server side modem 300 and unrelated to the transmit power of the client modem 320. Accordingly, for a given level of middle echo noise at the remote (server) modem 300, an improved signal to noise ratio may be provided by boosting the transmit power of the client modem 320.

In addition, a predetermined symbol rate is selected for the transmitter of the client modem 320 when the transmit data rate is less than the received data rate and the transmit data rate is less than the predetermined criterion (block 525). Preferably, when the client modem 320 is at least one of a V.34 standard modem and a V.90 standard modem, the predetermined symbol rate is established by only enabling 2400 as a symbol rate. For example, the INFO$_{1a}$ bits 34 through 36, as described in table 11 of the V.90 standard, may be set to specify only the 2400 symbol rate. Use of the lowest symbol rate provided by the V.90 standard may allow concentration of the signal strength received by the remote modem 300 within the lower portion of the channel spectrum as contrasted with the broad spectrum over which the reflected echo noise may be distributed. Furthermore, the lower symbol rate assists the remote modem 300 in canceling the middle echo as a given echo canceler length (number of filter taps) will be expected to cover a longer time delay.

In addition, strong pre-emphasis is disabled by the client modem 320 (block 530). Disabling strong pre-emphasis for transmitted signals by the server modem 300 may improve performance of the echo canceler of the remote modem 300 by providing a transmitted signal from the server modem 300 which has a flatter signal spectrum. In the case of a V.90 standard modem, disabling strong pre-emphasis may be provided by appropriate setting of bits 26 through 29 of the INFO$_{1a}$ signal as described in table 11 of the V.90 standard.

Preferably, pre-emphasis indices of 6 and above are disabled for transmissions by the server modem 300. The pre-emphasis indices are further described in table 4 of the V.34 standard which is also generated by the ITU.

Accordingly, by use of one or more of the communication configuration options described above with reference to blocks 520–530, improved communication reliability may be provided on a communication channel where the remote modem 300 is subject to middle echo noise caused by a digital discontinuity having longer delay times than those provided for by the echo canceler of the remote modem 300.

The present invention has been described above with reference to the block diagram illustration of FIGS. 3 and 4 and the flowchart illustration of FIG. 5. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions specified in the flowchart or block diagram block or blocks. The computer program instructions may be executed by a processor to cause a series of operational steps to be performed by the processor to produce a computer implemented process such that the instructions which execute on the processor provide steps for implementing the functions specified in the flowchart or block diagram block or blocks.

Accordingly, blocks of the block diagrams and/or flowchart illustrations support combinations of means for performing the specified functions, combinations of steps for performing the specified functions and program instruction means for performing the specified functions. It will also be understood that each block of the block diagrams and/or flowchart illustrations, and combinations of blocks in the block diagrams and/or flowchart illustrations, can be implemented by special purpose hardware-based systems which perform the specified functions or steps, or combinations of special purpose hardware and computer instructions.

It should also be noted that, in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

While the present invention has been illustrated and described in detail in the drawings and foregoing description, it is understood that the embodiments shown are merely exemplary. Moreover, it is understood that many variations and modifications can be made to the embodiments described herein above without substantially departing from the principles of the present invention. All such variations and modifications are intended to be included herein within the scope of the present invention, as set forth in the following claims.

We claim:

1. A method for configuring a local modem for a communication session with a remote modem, the method comprising the steps of:

detecting during startup of the communication session a receive data rate from the remote modem and a transmit data rate to the remote modem;

initiating a retrain when the transmit data rate is less than the receive data rate if the transmit data rate is less than a predetermined criterion; and boosting a transmit power to the remote modem of a transmitter of the local modem during the retrain initiated by the initiating step.

2. The method of claim 1 wherein the communication session is on a digitally discontinuous channel subject to echo noise and wherein the boosting step comprises the step of boosting the transmit power to provide a higher signal to echo noise ratio at the remote modem.

3. The method of claim 2 wherein the initiating step further comprises the step of setting a digital discontinuity flag when the transmit data rate is less than the receive data rate if the transmit data rate is less than the predetermined criterion and wherein the boosting step further comprises the step of boosting the transmit power during the retrain when the digital discontinuity flag is set.

4. The method of claim 1 further comprising the step of selecting a predetermined symbol rate for the transmitter when the transmit data rate is less than the receive data rate if the transmit data rate is less than the predetermined criterion.

5. The method of claim 4 wherein the modem and the remote modem are at least one of a V.34 standard modem and a V.90 standard modem and wherein the predetermined symbol rate is 2400 symbols per second.

6. The method of claim 4 wherein the selecting step further comprises the step of disabling strong pre-emphasis for a transmitter of the remote modem when the transmit data rate is less than the receive data rate if the transmit data rate is less than the predetermined criterion.

7. The method of claim 6 wherein the modem and the remote modem are at least one of a V.34 standard modem and a V.90 standard modem and wherein the disabling step further comprises the step of disabling pre-emphasis indexes of 6 and above.

8. The method of claim 6 wherein the initiating step further comprises the step of setting a digital discontinuity flag when the transmit data rate is less than the receive data rate if the transmit data rate is less than the predetermined criterion and wherein the selecting step comprising the step of selecting a predetermined symbol rate for the transmitter of local modem when the digital discontinuity flag is set and wherein the disabling step comprises the step of disabling strong pre-emphasis for the transmitter of the remote modem when the discontinuity flag is set.

9. The method of claim 6 wherein the boosting step, the selecting step and the disabling step are performed during phase 2 of startup of the communication session.

10. The method of claim 2 wherein the detecting step and the initiating step are performed during phase 4 of startup of the communication session.

11. A method for configuring a local modem for a communication session with a remote modem on a digitally discontinuous channel subject to echo noise, the method comprising the steps of:
   detecting during startup of the communication session a receive data rate from the remote modem and a transmit data rate to the remote modern; and
   selecting a predetermined symbol rate of 2400 symbols per second for a transmitter of the local modem in a $INFO_{1a}$ signal when the transmit data rate is less than the receive data rate if the transmit data rate is less than a predetermined criterion;
   wherein the local modem and the remote modem are at least one of a V3.4 standard modem and a V.90 standard modem.

12. The method of claim 11 wherein the selecting step further comprises the step of disabling strong pre-emphasis for a transmitter of the remote modem when the transmit data rate is less than the receive data rate if the transmit data rate is less than the predetermined criterion.

13. The method of claim 12 wherein the disabling step further comprises the step of disabling pre-emphasis indexes of 6 and above.

14. The method of claim 12 wherein the initiating step further comprises the step of setting a digital discontinuity flag when the transmit data rate is less than the receive data rate if the transmit data rate is less than the predetermined criterion and wherein the selecting step comprising the step of selecting a predetermined symbol rate for the transmitter of the local modem when the digital discontinuity flag is set and wherein the disabling step comprises the step of disabling strong pre-emphasis for the transmitter of the remote modem when the discontinuity flag is set.

15. A system for configuring a local modem for a communication session with a remote modem, the system comprising:
   means for detecting during startup of the communication session a receive data rate from the remote modem and a transmit data rate to the remote modern;
   means for initiating a retrain when the transmit data rate is less than the receive data rate if the transmit data rate is less than a predetermined criterion; and
   means for boosting a transmit power to the remote modem of a transmitter of the local modem during the retrain initiated by the initiating step.

16. The system of claim 15 wherein the means for initiating further comprises means for setting a digital discontinuity flag when the transmit data rate is less than the receive data rate if the transmit data rate is less than the predetermined criterion and wherein the means for boosting farther comprises means for boosting the transmit power during the retrain when the digital discontinuity flag is set.

17. The system of claim 15 further comprising means for selecting a predetermined symbol rate for the transmitter of the local modem when the transmit data rate is less than the receive data rate if the transmit data rate is less than the predetermined criterion.

18. The system of claim 17 wherein the modem and the remote modem are at least one of a V.34 standard modem and a V.90 standard modem and wherein the predetermined symbol rate is 2400 symbols per second.

19. The system of claim 17 wherein the means for selecting further comprises means for disabling strong pre-emphasis for a transmitter of the remote modem when the transmit data rate is less than the receive data rate if the transmit data rate is less than the predetermined criterion.

20. The system of claim 19 wherein the means for initiating further comprises means for setting a digital discontinuity flag when the transmit data rate is less than the receive data rate if the transmit data rate is less than the predetermined criterion and wherein the means for selecting further comprises means for selecting a predetermined symbol rate for the transmitter of the local modem when the digital discontinuity flag is set and wherein the means for disabling further comprises means for disabling strong pre-emphasis for the transmitter of the remote modem when the discontinuity flag is set.

21. A system for configuring a local modem for a communication session with a remote modem on a digitally discontinuous channel subject to echo noise, the system comprising:
   means for detecting during startup of the communication session a receive data rate from the remote modem and a transmit data rate to the remote modem; and means for selecting a predetermined symbol rate of 2400 symbols per second for a transmitter of the local modem by specifying the symbol rate in a $INFO_{1a}$ signal when the transmit data rate is less than the receive data rate if the transmit data rate is less than a predetermined criterion;

wherein the local modem and the remote modem are at least one of a V.34 standard modem and a V.90 standard modem.

22. The system of claim 21 wherein the means for selecting further comprises means for disabling strong pre-emphasis for a transmitter of the remote modem when the transmit data rate is less than the receive data rate if the transmit data rate is less than the predetermined criterion.

23. A computer program product for configuring a local modem for a communication session with a remote modem, comprising:

a computer readable storage medium having computer readable program code means embodied therein, the computer readable code means comprising:

computer readable code that detects during startup of the communication session a receive data rate from the remote modem and a transmit data rate to the remote modem;

computer readable code that initiates a retrain when the transmit data rate is less than the receive data rate if the transmit data rate is less than a predetermined criterion; and computer readable code that boosts a transmit power to the remote modem of a transmitter of the local modem during the retrain initiated by the initiating step.

24. The computer program product of claim 23 wherein the computer readable code that initiates further comprises computer readable code that sets a digital discontinuity flag when the transmit data rate is less than the receive data rate if the transmit data rate is less than the predetermined criterion and wherein the computer readable code that boosts farther comprises computer readable code that boosts the transmit power during the retrain when the digital discontinuity flag is set.

25. The computer program product of claim 23 further comprising computer readable code that selects a predetermined symbol rate for the transmitter when the transmit data rate is less than the receive data rate if the transmit data rate is less than the predetermined criterion.

26. The computer program product of claim 25 wherein the modem and the remote modem are at least one of a V.34 standard modem and a V.90 standard modem and wherein the predetermined symbol rate is 2400 symbols per second.

27. The computer program product of claim 25 wherein the computer readable code that selects further comprises computer readable code that disables strong pre-emphasis for a transmitter of the remote modem when the transmit data rate is less than the receive data rate if the transmit data rate is less than the predetermined criterion.

28. The computer program product of claim 27 wherein the computer readable code that initiates further comprises computer readable code that sets a digital discontinuity flag when the transmit data rate is less than the receive data rate if the transmit data rate is less than the predetermined criterion and wherein the computer readable code that selects further comprises computer readable code that selects a predetermined symbol rate for the transmitter of the local modem when the digital discontinuity flag is set and wherein the computer readable code that disables farther comprises computer readable code that disables strong pre-emphasis for the transmitter of the remote modem when the discontinuity flag is set.

29. A computer program product for configuring a local modem for a communication session with a remote modem on a digitally discontinuous channel subject to echo noise, the computer program product comprising:

a computer readable storage medium having computer readable program code means embodied therein, the computer readable code means comprising:

computer readable code that detects during startup of the communication session a receive data rate from the remote modem and a transmit data rate to the remote modem; and computer readable code that selects a predetermined symbol rate of 2400 symbols per second for a transmitter of the local modem in a $INFO_{1a}$ signal when the transmit data rate is less than the receive data rate if the transmit data rate is less than a predetermined criterion;

wherein the local modem and the remote modem are at least one of a V.34 standard modem and a V.90 standard modem.

30. The computer program product of claim 29 wherein the computer readable code that selects further comprises computer readable code that disables strong pre-emphasis for a transmitter of the remote modem when the transmit data rate is less than the receive data rate if the transmit data rate is less than the predetermined criterion.

* * * * *